(12) United States Patent
Seidel et al.

(10) Patent No.: US 7,442,667 B2
(45) Date of Patent: Oct. 28, 2008

(54) PREPARATION OF SUPPORTED COCATALYSTS

(75) Inventors: Naka Seidel, Frankfurt (DE); Bodo Richter, Limburgerhof (DE); Roland Kratzer, Hofheim (DE)

(73) Assignee: Bosell Polyolefine GmbH, Wesseling (DE)

( * ) Notice: Subject to any disclaimer, the term of this patent is extended or adjusted under 35 U.S.C. 154(b) by 11 days.

(21) Appl. No.: 10/583,064

(22) PCT Filed: Dec. 22, 2004

(86) PCT No.: PCT/EP2004/014582

§ 371 (c)(1),
(2), (4) Date: Jun. 15, 2006

(87) PCT Pub. No.: WO2005/063831

PCT Pub. Date: Jul. 14, 2005

(65) Prior Publication Data

US 2007/0149387 A1 Jun. 28, 2007

Related U.S. Application Data

(60) Provisional application No. 60/541,667, filed on Feb. 3, 2004.

(30) Foreign Application Priority Data

Dec. 23, 2003 (EP) .................................. 03029734

(51) Int. Cl.
*B01J 31/12* (2006.01)
*B01J 31/14* (2006.01)
*C08F 4/6592* (2006.01)

(52) U.S. Cl. ........................ 502/114; 502/103; 502/104; 502/120; 502/152; 526/129; 526/132; 526/133; 526/134; 526/160

(58) Field of Classification Search ................ 502/120, 502/103, 104, 114, 152, 128; 526/129, 133, 526/134, 132, 160
See application file for complete search history.

(56) References Cited

U.S. PATENT DOCUMENTS

| 6,255,418 | B1 | 7/2001 | Jolly et al. ................... 526/160 |
| 6,500,908 | B1 * | 12/2002 | Bohnen et al. ............... 526/160 |
| 6,759,361 | B2 * | 7/2004 | Lynch et al. ................. 502/102 |
| 6,784,261 | B1 | 8/2004 | Schopf et al. ................. 526/16 |
| 2004/0214970 | A1 | 10/2004 | Schopf et al. ............... 526/159 |

FOREIGN PATENT DOCUMENTS

| DE | 19710615 | 9/1998 |
| EP | 949273 | 10/1999 |
| EP | 1153938 | 11/2001 |
| WO | 96/04319 | 2/1996 |
| WO | 96/23005 | 8/1996 |
| WO | 98/22486 | 5/1998 |
| WO | 99/18135 | 4/1999 |
| WO | 99/33881 | 7/1999 |
| WO | 01/09148 | 2/2001 |
| WO | 02/098930 | 12/2002 |
| WO | 2004007570 | 1/2004 |

OTHER PUBLICATIONS

S. Charoenchaidet et al., "Improving the Performance of Heterogeneous Borane Cocatalysts by Pretreatment of the Silica Support with Alkylaluminum Compounds," *Macromol, Rapid Commun.*, vol. 23(7), p. 426-431 (2002).

H. Brintzinger et al., *ansa*-Metallocene derivatives; XVII. Racemic and *meso* diastereomers of group IV metallocene derivatives with symmetrically substituted, dimethylsilanediyl-bridged ligand frameworks. Crystal structure of R, S-Me$_2$Si(3-t-Bu-5-MeC$_5$-H$_2$)$_2$ZrCl$_2$; *Journal of Organometallic Chemistry*, vol. 369, p. 359-370 (1989).

M. Brookhart et al., "Highly Active Iron and Cobalt Catalysts for the Polymerization of Ethylene," *J. Am. Chem. Soc.*, vol. 120(16), p. 4049-4050 (1998).

(Continued)

*Primary Examiner*—Caixia Lu
(74) *Attorney, Agent, or Firm*—William R. Reid

(57) ABSTRACT

The present invention relates to a process for preparing a supported cocatalyst for olefin polymerization, which comprises reacting
A) a support bearing functional groups,
B) triethylaluminum and
C) a compound of the formula (I), $$(R^1)_x\text{—A—}(OH)_y \qquad (I)$$

where
A is an atom of group 13 or 15 of the Periodic Table,
$R^1$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalky, $C_7$-$C_{40}$-haloarylalkyl, $C_7$-$C_{40}$-alkylaryl, $C_7$-$C_{40}$-haloalkylaryl or an $OSiR_3^2$ group, where
$R^2$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl,
y is 1 or 2 and
x is 3 minus y.

In addition, the invention relates to supported cocatalysts obtainable by such a process, to the use of the supported cocatalysts for preparing a catalyst system for the polymerization of olefins, to catalyst systems for the polymerization of olefins obtainable from the supported cocatalysts and to a process for the polymerization of olefins in which these catalyst solids are used.

9 Claims, No Drawings

OTHER PUBLICATIONS

V. Gibson et al., "Novel olefin polymerization catalysts based on iron and cobalt," *Chem, Commun.*, p. 849-850 (1998).

M. Enders et al., "8-Quinolylcyclopentadienyl, a Ligand with a Tailored Fit for Chelate Complexes," *Chem. Ber.*, vol. 129, p. 459-463 (1996).

P. Jutzi et al., "Cyclopentadienyl compounds with nitrogen donors in the side-chain," *Journal of Organometallic Chemistry 500*, p. 175-185 (1995).

L. Resconi et al., "Selectivity in Propene Polymerization with Metallocene Catalysts," *Chem, Rev.*, vol. 100(4), p. 1253-1345 (2000).

* cited by examiner

PREPARATION OF SUPPORTED COCATALYSTS

This application is the U.S. national phase of International Application PCT/EP2004/014582, filed Dec. 22, 2004, claiming priority to European Patent Application 03029734.5 filed Dec. 23, 2003, and the benefit under 35 U.S.C. 119(e) of U.S. Provisional Application No. 60/541,667, filed Feb. 3, 2004; the disclosures of International Application PCT/EP2004/014582, European Patent Application 03029734.5 and U.S. Provisional Application No. 60/541,667, each as filed, are incorporated herein by reference.

The present invention relates to a process for preparing a supported cocatalyst for olefin polymerization, which comprises reacting a support bearing functional groups, triethylaluminum and a hydroxyl-containing compound containing an atom of group 13 or 15 of the Periodic Table. Furthermore, the present invention relates to supported cocatalysts obtainable by such a process, to the use of the supported cocatalysts for preparing a catalyst system for the polymerization of olefins, to catalyst systems for the polymerization of olefins obtainable from the supported cocatalysts and to a process for the polymerization of olefins in which these catalyst systems are used.

Organic transition metal compounds such as metallocene complexes are of great interest as catalysts for olefin polymerization because they make it possible to synthesize polyolefins which are not obtainable using conventional Ziegler-Natta catalysts. For example, such single site catalysts lead to polymers having a narrow molar mass distribution and a uniform comonomer content. For these to be able to be used successfully in gas-phase or suspension polymerization processes, it is often advantageous for the metallocenes to be used in the form of a solid, i.e. for them to be applied to a solid support. Furthermore, the supported catalysts should have a high productivity and lead to polymers having a good morphology.

For organic transition metal compounds such as metallocenes to be effective as catalysts for olefin polymerization, it is necessary for them to be reacted with further compounds serving as cocatalysts. A frequently used class of cocatalysts consists of aluminoxanes such as methylaluminoxane (MAO). However, these have the disadvantage that they have to be used in a large excess. Furthermore, compounds which convert the organic transition metal compounds into cationic complexes can also be used as cocatalysts.

WO 99/18135 describes catalyst systems comprising an organoboron-aluminum compound, a metallocene and an aluminum compound, with the catalyst systems being able to further comprise a support. The organoboron-aluminum compounds are prepared by reacting dihydroxyorganoboranes or triorganoboroxins with organoaluminum compounds and then applying them as such to the support.

WO 96/04319, WO 96/23005 and WO 99/33881 describe catalyst systems in whose preparation a support is firstly reacted with a Lewis acid such as trispentafluorophenylborane which acts as cocatalyst. The modified support in which the Lewis acid is covalently bound to the support material is subsequently reacted with a metallocene or a mixture of a metallocene and an organometallic compound. S. Charoenchaidet, S. Chavadej and E. Gulari, Macromol. Rapid Commun. 23 (2002), 426-431, state that catalyst systems comprising supported cocatalysts which are obtainable by reaction of silica gel with trispentafluorophenylborane and trityl chloride have an increased activity in ethylene polymerization when the silica gel has been reacted with an aluminum alkyl before being brought into contact with trispentafluorophenylborane.

EP-A 1 153 938 describes catalyst systems in which a modified support is firstly prepared by reacting a support with an organometallic compound and a compound having functional groups containing active hydrogen. The modified support is then brought into contact with an organic transition metal compound and a further organometallic compound. As compounds having functional groups containing active hydrogen, use is made of organic compounds which contain not only the functional group containing active hydrogen but also an electron-withdrawing group.

EP-A 949 273 describes modified particles obtained by contacting dry support particles with an organometallic compound and subsequently with a compound having a functional group containing active hydrogen or a non-proton donative Lewis basic functional group and an electron attractive group.

The above-described processes for preparing supported catalyst systems are all quite complicated. Furthermore, the starting materials used are generally very expensive and the polymerization activities of the catalyst systems are still capable of improvement.

It is an object of the present invention to find a process for preparing a supported cocatalyst for olefin polymerization which is relatively simple, in which relatively inexpensive starting materials can be used and which leads to catalyst systems having an increased polymerization activity or in which a good polymerization activity of the catalyst solids can be achieved using only a smaller amount of expensive starting materials or using less expensive starting materials.

We have found that this object is achieved by a process for preparing a supported cocatalyst for olefin polymerization, which comprises reacting A) a support bearing functional groups, B) triethylaluminum and C) a compound of the formula (I), $$(R^1)_x\text{---}A\text{---}(OH)_y \qquad (I)$$

where

A is an atom of group 13 or 15 of the Periodic Table, $R^1$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, C6-$C_{20}$-aryloxy, $C_7$-$C_{40}$-arylalky, $C_7$-$C_{40}$-haloarylalkyl, $C_7$-$C_{40}$-alkylaryl, $C_7$-$C_{40}$-haloalkylaryl or an $OSiR_3^2$ group, where $R^2$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl, y is 1 or 2 and x is 3 minus y.

We have also found supported cocatalysts obtainable by such a process, the use of the supported cocatalysts for preparing a catalyst system for the polymerization of olefins, catalyst systems for the polymerization of olefins obtainable from the supported cocatalysts and a process for the polymerization of olefins in which these catalyst systems are used.

The supported cocatalysts prepared according to the present invention are suitable for the polymerization of olefins and especially for the polymerization of α-olefins, i.e. hydrocarbons having terminal double bonds. Suitable monomers include functionalized olefinically unsaturated compounds such as ester or amide derivatives of acrylic or methacrylic acid, for example acrylates, methacrylates or acrylonitrile. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various α-olefins.

Suitable olefins also include ones in which the double bond is part of a cyclic structure which may comprise one or more ring systems. Examples of such olefins are cyclopentene, norbornene, tetracyclododecene and methylnorbornene and dienes such as 5-ethylidene-2-norbornene, norbornadiene and ethylnorbornadiene.

It is also possible to polymerize mixtures of two or more olefins.

The supported cocatalysts of the present invention are particularly useful for the polymerization or copolymerization of ethylene or propylene. As comonomers in ethylene polymerization, preference is given to using $C_3$-$C_8$-α-olefins, in particular 1-butene, 1-pentene, 1-hexene and/or 1-octene. Preferred comonomers in propylene polymerization are ethylene and/or 1-butene.

In the process of the invention for preparing a supported cocatalyst, a support bearing functional groups A), triethylaluminum B) and a hydroxyl-containing compound containing an atom of group 13 or 15 of the Periodic Table C) are reacted with each other.

Preferred supports A) are ones whose functional groups contain active hydrogen. Suitable functional groups are, for example, hydroxyl groups, primary and secondary amino groups, mercapto groups, silanol groups, carboxyl groups, amido groups or imido groups, with hydroxyl groups being preferred.

Supports used are preferably finely divided organic or inorganic solids which bear the appropriate functional groups. Examples are sheet silicates, inorganic oxides or finely divided functionalized polymer powders.

Inorganic oxides suitable as supports may be found among oxides of the elements of groups 2, 3, 4, 5, 13, 14, 15 and 16 of the Periodic Table of the Elements. Preference is given to oxides or mixed oxides of the elements calcium, aluminum, silicon, magnesium or titanium and also corresponding oxide mixtures. Other inorganic oxides which can be used on their own or in combination with the abovementioned oxidic supports are, for example, $ZrO_2$ or $B_2O_3$. Preferred oxides are silicon dioxide, in particular in the form of a silica gel or a pyrogenic silica, or aluminum oxide. A preferred mixed oxide is, for example, calcined hydrotalcite.

The support materials used preferably have a specific surface area in the range from 10 to 1 000 $m^2/g$, preferably from 50 to 500 $m^2/g$ and in particular from 200 to 400 $m^2/g$, and a pore volume in the range from 0.1 to 5 ml/g, preferably from 0.5 to 3.5 ml/g and in particular from 0.8 to 3.0 ml/g. The mean particle size of the finely divided supports is generally in the range from 1 to 500 μm, preferably from 5 to 350 μm and in particular from 10 to 100 μm.

The inorganic support can be subjected to a thermal treatment, e.g. for removing adsorbed water. Such a drying treatment is generally carried out at from 80 to 300° C., preferably from 100 to 200° C., and is preferably carried out under reduced pressure and/or in a stream of inert gas, for example nitrogen or argon. The inorganic support can also be calcined, in which case the concentration of OH groups on the surface is adjusted and the structure of the solid may be altered by a treatment at from 200 to 1 000° C.

Further possible support materials are functionalized polymer supports, e.g. those based on polystyrenes or polyolefins such as polyethylene or polypropylene, whose functional groups may be, for example, ammonium or hydroxyl groups.

Preferred compounds C) are ones in which

A is an atom of group 13 of the Periodic Table, preferably an atom of group 13 of the Periodic Table different from aluminum, i.e. boron, gallium, indium or thallium and very particularly preferably boron.

Preference is also given to compounds of the formula (I) in which $R^1$ are identical or different and are each, independently of one another, hydrogen, halogen, $C_6$-$C_{14}$-aryl, $C_6$-$C_{14}$-haloaryl, $C_1$-$C_{14}$-alkyl, $C_1$-$C_{14}$-haloalkyl, $C_7$-$C_{30}$-arylalky, $C_7$-$C_{30}$-haloarylalkyl, $C_7$-$C_{30}$-alkylaryl or $C_7$-$C_{30}$-haloalkylaryl and are each particularly preferably $C_6$-$C_{10}$-aryl, $C_6$-$C_{10}$-haloaryl, $C_1$-$C_6$-alkyl, $C_1$-$C_6$-haloalkyl, $C_7$-$C_{20}$-alkylaryl or $C_7$-$C_{20}$-haloalkylaryl.

Examples of preferred compounds of the formula (I) are borinic acids of the formula $R^1{}_2B(OH)$ and boronic acids of the formula $R^1B(OH)_2$, where $R^1$ is particularly preferably $C_6$-$C_{10}$-haloaryl, $C_7$-$C_{20}$-alkylaryl or $C_7$-$C_{20}$-haloalkylaryl.

The support bearing functional groups A), triethylaluminum B) and the hydroxyl-containing compound C) can be combined in any order. Preferably the support bearing functional groups A) is first reacted with triethylaluminum B) and subsequently the reaction product is allowed to react with the compound of the formula (I) C).

The components are usually combined with one other in the presence of an organic solvent in which the support has been suspended. Suitable solvents are aromatic or aliphatic solvents, for example hexane, heptane, toluene or xylene, or halogenated hydrocarbons such as methylene chloride or halogenated aromatic hydrocarbons such as o-dichlorobenzene. If the support is first reacted with triethylaluminum the compound C) is preferably combined with the reaction product of triethylaluminum and the support A) in the presence of the organic solvent in which the support has been suspended and in which the reaction of triethylaluminum with the support has been carried out. However, it is also possible for the reaction product of triethylaluminum and the support A) to be isolated first and the isolated or resuspended reaction product to be reacted with the compound C) subsequently.

The components are generally combined at temperatures in the range from −20° C. to 150° C., preferably from 0° C. to 80° C. The time for which the components are allowed to react with one another is generally from 1 to 76 hours. Preference is given to reaction times of from 2 to 48 hours, in particular from 6 to 24 hours and very particularly from 10 to 15 hours.

If the support is first reacted with triethylaluminum the time for which these components are allowed to react with one another is generally from 10 minutes to 48 hours. Preference is given to reaction times of from 20 minutes to 6 hours, in particular from 30 minutes to 1 hour. The time for which the reaction product of triethylaluminum and the support A) is subsequently allowed to react with the compound C) is generally from 1 to 48 hours. Preference is given to reaction times of from 6 to 24 hours and in particular from 10 to 15 hours.

The molar ratio of triethylaluminum B) to functional groups of the support A) is usually from 0.05:1 to 100:1, preferably from 0.2:1 to 20:1, in particular from 1:1 to 5:1.

The molar ratio of triethylaluminum B) to compound C) is generally from 0.05:1 to 20:1, preferably from 0.2:1 to 5:1, particularly preferably form 0.5:1 to 3:1, in particular from 0.5:1 to 2:1.

The cocatalysts obtainable by means of the process of the present invention, which are likewise provided by the present invention, can be used, in particular, for preparing a catalyst system for olefin polymerization. Such catalyst systems, which are likewise provided by the present invention, are generally obtained by bringing the supported cocatalysts into contact with at least one organic transition metal compound D).

As organic transition metal compound D), it is in principle possible to use any compounds of the transition metals of groups 3 to 12 of the Periodic Table or the lanthanides which contain organic groups and form active olefin polymerization catalysts after reaction with the supported cocatalysts obtainable from the components A) to C) and, if desired, the organometallic compounds E). These are usually compounds in which at least one monodentate or polydentate ligand is bound to the central atom via sigma or pi bonds. Possible ligands include ones containing cyclopentadienyl radicals and also ones which are free of cyclopentadienyl radicals. A large number of such compounds D) suitable for olefin polymerization are described in Chem. Rev. 2000, Vol. 100, No. 4. Furthermore, polycyclic cyclopentadienyl complexes are also suitable for olefin polymerization.

Particularly useful organic transition metal compounds D) are ones containing at least one cyclopentadienyl-type ligand. Those containing two cyclopentadienyl-type ligands are commonly referred to as metallocene complexes. Among organic transition metal compounds D) containing at least one cyclopentadienyl-type ligand, compounds which have been found to be particularly suitable are those of the formula (III)

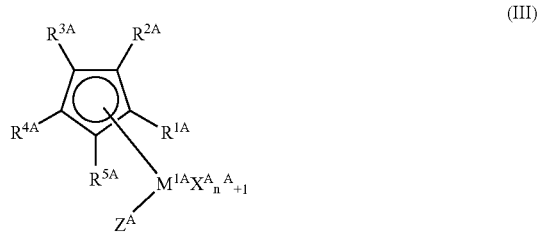

(III)

where the substituents and indices have the following meanings:

$M^{1A}$ is titanium, zirconium, hafnium, vanadium, niobium, tantalum, chromium, molybdenum or tungsten, or an element of group 3 of the Periodic Table and the lanthanides, $X^{1A}$ are identical or different and are each, independently of one another, fluorine, chlorine, bromine, iodine, hydrogen, $C_1$-$C_{10}$-alkyl, $C_2$-$C_{10}$-alkenyl, $C_6$-$C_{15}$-aryl, $C_7$-$C_{40}$-alkylaryl, $C_7$-$C_{40}$-arylalkyl, —$OR^{6A}$ or —$NR^{6A}_R{}^{7A}$ or two radicals $X^A$ are joined to one another and together form, for example, a substituted or unsubstituted diene ligand, in particular a 1,3-diene ligand, or a biaryloxy group, where $R^{6A}$ and $R^{7A}$ are each $C_1$-$C_{10}$-alkyl, $C_6$-$C_{15}$-aryl, $C_7$-$C_{40}$-arylalkyl, $C_7$-$C_{40}$-alkylaryl, fluoroalkyl or fluoroaryl each having from 1 to 16 carbon atoms in the alkyl radical and from 6 to 21 carbon atoms in the aryl radical, $n^A$ is 1, 2 or 3, where $n^A$ is such that the metallocene complex of the formula (III) is uncharged for the given valence of M, $R^{1A}$ to $R^{5A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{8A}_2$, —$N(SiR^{8A}_3)_2$, —$OR^{8A}$, —$OSiR^{8A}_3$, —$SiR^{8A}_3$, where the radicals $R^{1A}$ to $R^{5A}$ may also be substituted by halogen or two radicals $R^{1A}$ to $R^{5A}$, in particular adjacent radicals, together with the atoms connecting them may be joined to form a preferably five-, six- or seven-membered ring or a preferably five-, six- or seven-membered heterocycle which contains at least one atom selected from the group consisting of N, P, O and S, where $R^{8A}$ are identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^A$ is as defined for $X^A$ or is

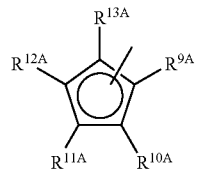

where the radicals $R^{9A}$ to $R^{13A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{14A}_2$, —$N(SiR^{14A}_3)_2$, —$OR^{14A}$, —$OSiR^{14A}_3$, —$SiR^{14A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably five-, six- or seven-membered ring or a preferably five-, six- or seven-membered heterocycle which contains at least one atom selected from the group consisting of N, P, O and S, where $R^{14A}$ are identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, or the radicals $R^{4A}$ and $Z^A$ together form an —$R^{15A}_v$A—$A^A$- group, where

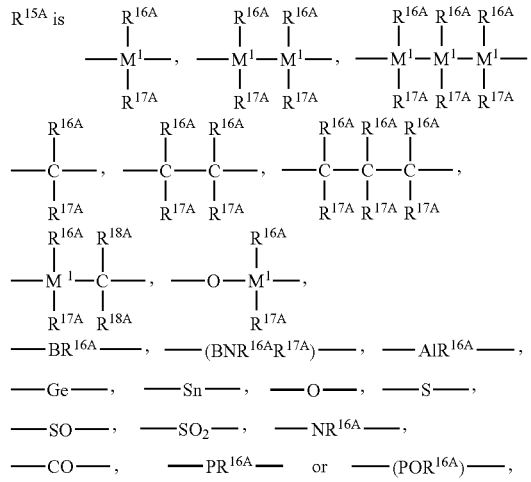

where $R^{16A}$, $R^{17A}$ and $R^{18A}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2A}$ is silicon, germanium or tin, preferably silicon, $A^A$ is —O—, —S—, —NR$^{19A}$—, —PR$^{19A}$—, —O—R$^{19A}$, —NR$^{19A}{}_2$, —PR$^{19A}{}_2$ or an unsubstituted, substituted or fused, heterocyclic ring system, where $R^{19A}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or —Si($R^{20A}$)$_3$, $R^{20A}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl, $v^A$ is 1 or, if $A^A$ is an unsubstituted, substituted or fused, heterocyclic ring system, 1 or 0 or the radicals $R^{4A}$ and $R^{12A}$ together form an —$R^{15A}$— group.

It is preferred that the radicals $X^A$ in the formula (III) are identical, preferably fluorine, chlorine, bromine, $C_1$-$C_7$-alkyl or arylalkyl, in particular chlorine, methyl or benzyl.

Among the organic transition metal compounds of the formula (III), preference is given to

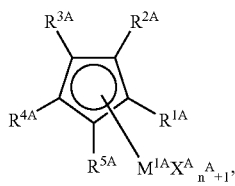
(IIIa)

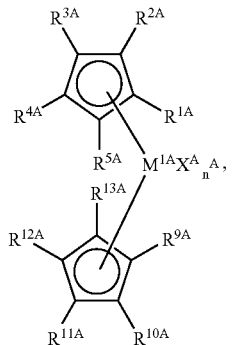
(IIIb)

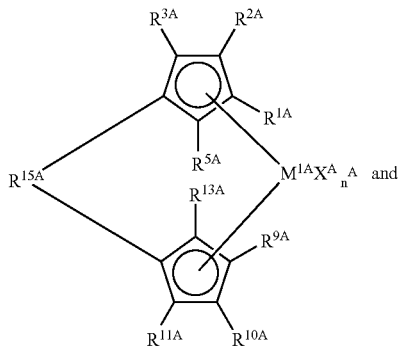
(IIIc)

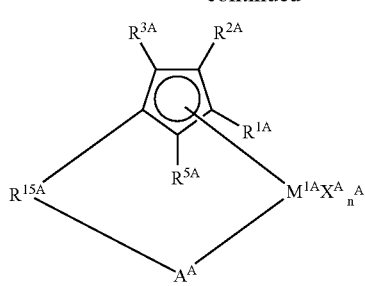
(IIId)

Among the compounds of the formula (IIIa), particular preference is given to those in which $M^{1A}$ is titanium or chromium, $X^A$ is chlorine, $C_1$-$C_4$-alkyl, phenyl, alkoxy or aryloxy, $n^A$ is 1 or 2 and $R^{1A}$ to $R^{5A}$ are each hydrogen or $C_1$-$C_4$-alkyl or two adjacent radicals $R^{1A}$ to $R^{5A}$ together with the atoms connecting them form a substituted or unsubstituted unsaturated six-membered ring.

Among the metallocenes of the formula (IIIb), preference is given to those in which $M^{1A}$ is titanium, zirconium, hafnium or chromium, $X^A$ is chlorine, $C_1$-$C_4$-alkyl or benzyl, or two radicals X form a substituted or unsubstituted butadiene ligand, $n^A$ is 1 or 2, preferably 2, or, if $M^{1A}$ is chromium, 0, $R^{1A}$ to $R^{5A}$ are each hydrogen, $C_1$-$C_8$-alkyl, $C_6$-$C_{10}$-aryl, —NR$^{8A}{}_2$, —OSiR$^{8A}{}_3$, —SiR$^{8A}{}_3$ or —Si(R$^{8A}$)$_3$ and $R^{9A}$ to $R^{13A}$ are each hydrogen, $C_1$-$C_8$-alkyl, $C_6$-$C_{10}$-aryl, —NR$^{8A}{}_2$, —OSiR$^{8A}{}_3$, —SiR$^{8A}{}_3$ or —Si(R$^{8A}$)$_3$ or in each case two radicals $R^{1A}$ to $R^{5A}$ and/or $R^{9A}$ to $R^{13A}$ together with the cyclopentadienyl ring form an indenyl or substituted indenyl system.

Particularly useful compounds of the formula (IIIb) are those in which the cyclopentadienyl radicals are identical.

Examples of particularly useful compounds of the formula (IIIb) are bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride,
bis(1-n-butyl-3-methylcyclopentadienyl)zirconium dichloride,
bis(indenyl)zirconium dichloride,
bis(tetrahydroindenyl)zirconium dichloride and
bis(trimethylsilylcyclopentadienyl)zirconium dichloride and also the corresponding dimethylzirconium compounds.

Particularly useful metallocenes of the formula (IIIc) are those in which $R^{1A}$ and $R^{9A}$ are identical or different and are each hydrogen or a $C_1$-$C_{10}$-alkyl group, $R^{5A}$ and $R^{13A}$ are identical or different and are each hydrogen or a methyl, ethyl, isopropyl or tert-butyl group, $R^{3A}$ and $R^{11A}$ are each $C_1$-$C_4$-alkyl and $R^{2A}$ and $R^{10A}$ are each hydrogen or two adjacent radicals $R^{2A}$ and $R^{3A}$ or $R^{10A}$ and $R^{11A}$ together form a saturated or unsaturated cyclic group having from 4 to 44 carbon atoms, $R^{15A}$ is —$M^{2A}R^{16A}R^{17A}$ or —CR$^{16A}$R$^{17A}$—CR$^{16A}$R$^{17A}$— or —BR$^{16A}$ or —BNR$^{16A}$R$^{17A}$—, $M^{1A}$ is titanium, zirconium or hafnium and $X^A$ are identical or different and are each chlorine, $C_1$-$C_4$-alkyl, benzyl, phenyl or $C_7$-$C_{15}$-alkylaryloxy.

Particularly useful compounds of the formula (IIIc) are those of the formula (IIIc')

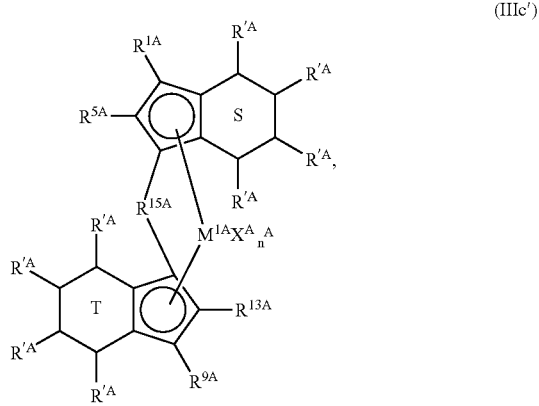

(IIIc')

where the radicals $R'^A$ are identical or different and are each hydrogen, $C_1$-$C_{10}$-alkyl or $C_3$-$C_{10}$-cycloalkyl, preferably methyl, ethyl, isopropyl or cyclohexyl, $C_6$-$C_{20}$-aryl, preferably phenyl, naphthyl or mesityl, $C_7$-$C_{40}$-arylalkyl, $C_7$-$C_{40}$-alkylaryl, preferably 4-tert-butylphenyl or 3,5-di-tert-butylphenyl, or $C_8$-$C_{40}$-arylalkenyl, $R^{5A}$ and $R^{13A}$ are identical or different and are each hydrogen, $C_1$-$C_6$-alkyl, preferably methyl, ethyl, isopropyl, n-propyl, n-butyl, n-hexyl or tert-butyl, and the rings S and T are identical or different, saturated, unsaturated or partially saturated.

The indenyl or tetrahydroindenyl ligands of the metallocenes of the formula (IIIc') are preferably substituted in the 2 position, the 2,4 positions, the 4,7 positions, the 2,4,7 positions, the 2,6 positions, the 2,4,6 positions, the 2,5,6 positions, the 2,4,5,6 positions or the 2,4,5,6,7 positions, in particular in the 2,4 positions, with the following nomenclature being employed for the site of substitution:

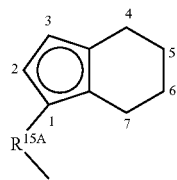

As complexes (IIIc'), preference is given to using bridged bisindenyl complexes in the rac or pseudo-rac form. For the present purposes, the pseudo-rac form refers to complexes in which the two indenyl ligands are in the rac arrangement relative to one another when all other substituents of the complex are disregarded.

Examples of particularly useful metallocenes (IIIc) and (IIIc') are dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(3-tert-butyl-5-methylcyclopentadienyl)zirconium dichloride, dimethylsilanediylbis(3-tert-butyl-5-ethylcyclopentadienyl)zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(3-methyl-5-methylcyclopentadienyl)zirconium dichloride, dimethylsilanediylbis(3-ethyl-5-isopropylcyclopentadienyl)zirconium dichloride, dimethylsilanediylbis(2-ethylindenyl)zirconium dichloride, dimethylsilanediylbis(2-methyl-4,5-benzindenyl)zirconium dichloride dimethylsilanediylbis(2-ethyl-4,5-benzindenyl)zirconium dichloride methylphenylsilanediylbis(2-methyl-4,5-benzindenyl)zirconium dichloride, methylphenylsilanediylbis(2-ethyl-4,5-benzindenyl)zirconium dichloride, diphenylsilanediylbis(2-methyl-4,5-benzindenyl)zirconium dichloride, diphenylsilanediylbis(2-ethyl-4,5-benzindenyl)zirconium dichloride, diphenylsilanediylbis(2-methylindenyl)hafnium dichloride, dimethylsilanediylbis(2-methyl-4-phenylindenyl)zirconium dichloride, dimethylsilanediylbis(2-ethyl-4-phenylindenyl)zirconium dichloride, dimethylsilanediylbis(2-methyl-4-(1-naphthyl)indenyl)zirconium dichloride, dimethylsilanediylbis(2-ethyl-4-(1-naphthyl)indenyl)zirconium dichloride, dimethylsilanediylbis(2-propyl-4-(1-naphthyl)indenyl)zirconium dichloride, dimethylsilanediylbis(2-i-butyl-4-(1-naphthyl)indenyl)zirconium dichloride, dimethylsilanediylbis(2-propyl-4-(9-phenanthryl)indenyl)zirconium dichloride, dimethylsilanediylbis(2-methyl-4-isopropylindenyl)zirconium dichloride, dimethylsilanediylbis(2,7-dimethyl-4-isopropylindenyl)zirconium dichloride, dimethylsilanediylbis(2-methyl-4,6-diisopropylindenyl)zirconium dichloride, dimethylsilanediylbis(2-methyl-4-[p-trifluoromethylphenyl]indenyl)zirconium dichloride, dimethylsilanediylbis(2-methyl-4-[3',5'-dimethylphenyl]indenyl)zirconium dichloride, dimethylsilanediylbis(2-methyl-4-[4'-tert-butylphenyl]indenyl)zirconium dichloride, diethylsilanediylbis(2-methyl-4-[4'-tert-butylphenyl]indenyl)zirconium dichloride, dimethylsilanediylbis(2-ethyl-4-[4'-tert-butylphenyl]indenyl)zirconium dichloride, dimethylsilanediylbis(2-propyl-4-[4'-tert-butylphenyl]indenyl)zirconium dichloride,
dimethylsilanediylbis(2-isopropyl-4-[4'-tert-butylphenyl]indenyl)zirconium dichloride,
dimethylsilanediylbis(2-n-butyl-4-[4'-tert-butylphenyl]indenyl)zirconium dichloride,
dimethylsilanediylbis(2-hexyl-4-[4'-tert-butylphenyl]indenyl)zirconium dichloride,
dimethylsilanediyl(2-isopropyl-4-phenylindenyl)-(2-methyl-4-phenylindenyl)zirconium dichloride,
dimethylsilanediyl(2-isopropyl-4-(1-naphthyl)indenyl)-(2-methyl-4-(1-naphthyl)indenyl)zirconium dichloride,
dimethylsilanediyl(2-isopropyl-4-[4'-tert-butylphenyl]indenyl)-(2-methyl-4-[4'-tert-butylphenyl]-indenyl)zirconium dichloride,
dimethylsilanediyl(2-isopropyl-4-[4'-tert-butylphenyl]indenyl)-(2-ethyl-4-[4'-tert-butylphenyl]-indenyl)zirconium dichloride,
dimethylsilanediyl(2-isopropyl-4-[4'-tert-butylphenyl]indenyl)-(2-methyl-4-[3',5'-bis-tert-butylphenyl]indenyl)zirconium dichloride,
dimethylsilanediyl(2-isopropyl-4-[4'-tert-butylphenyl]indenyl)-(2-methyl-4-[1'-naphthyl]indenyl)-zirconium dichloride and
ethylene(2-isopropyl-4-[4'-tert-butylphenyl]indenyl)-(2-methyl-4-[4'-tert-butylphenyl]indenyl)-zirconium dichloride and the corresponding dimethylzirconium, monochloromono(alkylaryloxy)zirconium and di-(alkylaryloxy)zirconium compounds.

Particularly useful compounds of the formula (IIId) are those in which
$M^{1A}$ is titanium or zirconium, in particular titanium, and
$X^A$ is chlorine, $C_1$-$C_4$-alkyl or phenyl or two radicals X together form a substituted or unsubstituted butadiene ligand,
$R^{15A}$ is —$SiR^{16A}R^{17A}$— or —$CR^{16A}R^{17A}$—$CR^{16A}R^{17A}$—, and
$A^A$ is —O—, —S— or —$NR^{19A}$—,
$R^{1A}$ to $R^{3A}$ and $R^{5A}$ are each hydrogen, $C_1$-$C_{10}$-alkyl, preferably methyl, $C_3$-$C_{10}$-cycloalkyl, $C_6$-$C_{15}$-aryl or —Si($R^{8A}$)$_3$, or two adjacent radicals form a cyclic group having from 4 to 12 carbon atoms, with particular preference being given to all $R^{1A}$ to $R^{3A}$ and $R^{5A}$ being methyl.

Another group of compounds of the formula (IIId) which are particularly useful are those in which
$M^{1A}$ is titanium or chromium, preferably in the oxidation state III and
$X^A$ is chlorine, $C_1$-$C_4$-alkyl or phenyl or two radicals $X^A$ form a substituted or unsubstituted butadiene ligand,
$R^{15A}$ is —$SiR^{16A}R^{17A}$— or —$CR^{16A}R^{17A}$—$CR^{16A}R^{17A}$—, and
$A^A$ is —O—$R^{19A}$, —$NR^{19A}{}_2$, —$PR^{19A}{}_2$,
$R^{1A}$ to $R^{3A}$ and $R^{5A}$ are each hydrogen, $C_1$-$C_{10}$-alkyl, $C_3$-$C_{10}$-cycloalkyl, $C_6$-$C_{15}$-aryl or —Si($R^{8A}$)$_3$, or two adjacent radicals form a cyclic group having from 4 to 12 carbon atoms.

The synthesis of such complexes can be carried out by methods known per se, with preference being given to the reaction of the appropriately substituted, cyclic hydrocarbon anions with halides of titanium, zirconium, hafnium, vanadium, niobium, tantalum or chromium.

Examples of appropriate preparative methods are described, for example, in Journal of Organometallic Chemistry, 369 (1989), 359-370.

Further suitable organic transition metal compounds A) are metallocenes having at least one ligand which is formed by a cyclopentadienyl or heterocyclopentadienyl and a fused-on heterocycle. In the heterocycles, at least one carbon atom is replaced by a heteroatom, preferably from group 15 or 16 of the Periodic Table and in particular nitrogen or sulfur. Such compounds are described, for example, in WO 98/22486. These are, in particular, dimethylsilanediyl(2-methyl-4-phenylindenyl)-(2,5-dimethyl-N-phenyl-4-azapentalene)zirconium dichloride,
dimethylsilanediylbis(2-methyl-4-phenyl-4-hydroazulenyl) zirconium dichloride and
dimethylsilanediylbis(2-ethyl-4-phenyl-4-hydroazulenyl) zirconium dichloride.

Further examples of organic transition metal compounds D) which are suitable for the purposes of the present invention are transition metal complexes with at least one ligand of the formulae (IVa) to (IVe),

(IVa)

(IVb)

(IVc)

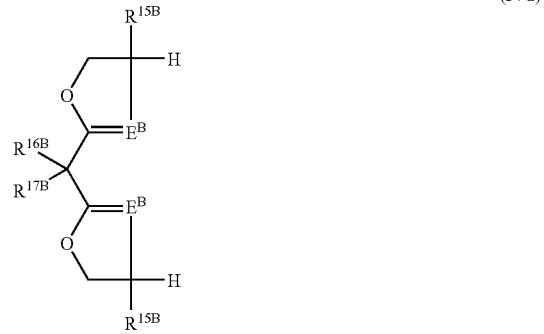
(IVd)

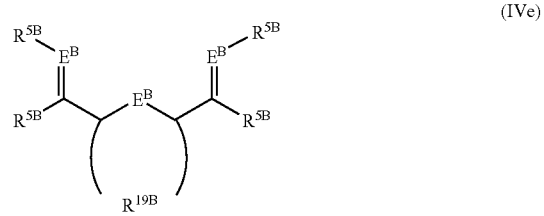
(IVe)

where the transition metal is selected from among the elements Ti, Zr, Hf, Sc, V, Nb, Ta, Cr, Mo, W, Fe, Co, Ni, Pd, Pt or is an element of the rare earth metals. Preference is given to compounds containing nickel, iron, cobalt or palladium as central metal.

$E^B$ is an element of group 15 of the Periodic Table of the Elements, preferably N or P, particularly preferably N. The two or three atoms $E^B$ in a molecule can be identical or different.

The radicals $R^{1B}$ to $R^{19B}$, which can be identical or different within a ligand system of the formulae (IVa) to (IVe), have the following meanings:

$R^{1B}$ and $R^{4B}$ are, independently of one another, hydrocarbon or substituted hydrocarbon radicals, preferably hydrocarbon radicals in which the carbon atom adjacent to the element $E^B$ is connected to at least two carbon atoms, $R^{2B}$ and $R^{3B}$ are each, independently of one another, hydrogen or a hydrocarbon or substituted hydrocarbon radical, where $R^{2B}$ and $R^{3B}$ may also together form a ring system in which one or more heteroatoms may be present, $R^{6B}$ and $R^{8B}$ are, independently of one another, hydrocarbon or substituted hydrocarbon radicals, $R^{5B}$ and $R^{9B}$ are each, independently of one another, hydrogen or a hydrocarbon or substituted hydrocarbon radical, where $R^{6B}$ and $R^{5B}$ or $R^{8B}$ and $R^{9B}$ may also together form a ring system, $R^{7B}$ are each, independently of one another, hydrogen or a hydrocarbon or substituted hydrocarbon radical, where two $R^{7A}$ may also together form a ring system, $R^{10B}$ and $R^{14B}$ are, independently of one another, hydrocarbon or substituted hydrocarbon radicals, $R^{11B}$, $R^{12B}$, $R^{12B'}$ and $R^{13B}$ are each, independently of one another, hydrogen or a hydrocarbon or substituted hydrocarbon radical, where two or more geminal or vicinal radicals $R^{11B}$, $R^{12B}$, $R^{12B'}$ and $R^{13B}$ may also together form a ring system, $R^{15B}$ and $R^{18B}$ are each, independently of one another, hydrogen or a hydrocarbon or substituted hydrocarbon radical, $R^{16B}$ and $R^{17B}$ are each, independently of one another, hydrogen or a hydrocarbon or substituted hydrocarbon radical, $R^{19B}$ is an organic radical which forms a 5- to 7-membered substituted or unsubstituted, in particular unsaturated or aromatic, heterocyclic ring system, in particular together with $E^B$ a pyridine system, $n^{1B}$ is 0 or 1, with compounds of the formula (IVc) in which $n^{1B}$ is 0 being negatively charged, and $n^{2B}$ is an integer from 1 to 4, preferably 2 or 3.

Particularly useful transition metal complexes with ligands of the formulae (IVa) to (IVd) are, for example, complexes of the transition metals Fe, Co, Ni, Pd or Pt with ligands of the formula (IVa). Particular preference is given to diimine complexes of Ni or Pd, e.g.:

di(2,6-di-i-propylphenyl)-2,3-dimethyldiazabutadienepalladium dichloride,
di(di-i-propylphenyl)-2,3-dimethyldiazabutadienenickel dichloride,
di(2,6-di-i-propylphenyl)-2,3-dimethyldiazabutadienedimethylpalladium,
di(2,6-di-i-propylphenyl)-2,3-dimethyldiazabutadienedimethylnickel,
di(2,6-dimethylphenyl)-2,3-dimethyldiazabutadienepalladium dichloride,
di(2,6-dimethylphenyl)-2,3-dimethyidiazabutadienenickel dichloride,
di(2,6-dimethylphenyl)-2,3-dimethyldiazabutadienedimethylpalladium,
di(2,6-dimethylphenyl)-2,3-dimethyldiazabutadienedimethylnickel,
di(2-methylphenyl)-2,3-dimethyldiazabutadienepalladium dichloride,
di(2-methylphenyl)-2,3-dimethyidiazabutadienenickel dichloride,
di(2-methylphenyl)-2,3-dimethyldiazabutadienedimethylpalladium,
di(2-methylphenyl)-2,3-dimethyldiazabutadienedimethylnickel,
diphenyl-2,3-dimethyidiazabutadienepalladium dichloride,
diphenyl-2,3-dimethyldiazabutadienenickel dichloride,
diphenyl-2,3-dimethyldiazabutadienedimethylpalladium,
diphenyl-2,3-dimethyldiazabutadienedimethyinickel,
di(2,6-dimethylphenyl)azanaphthenepalladium dichloride,
di(2,6-dimethylphenyl)azanaphthenenickel dichloride,
di(2,6-dimethylphenyl)azanaphthenedimethylpalladium,
di(2,6-dimethylphenyl)azanaphthenedimethylnickel,
1,1'-bipyridylpalladium dichloride,
1,1'-bipyridylnickel dichloride,
1,1'-bipyridyldimethylpalladium or
1,1'-bipyridyldimethylnickel.

Particularly useful compounds (IVe) are those which are described in J. Am. Chem. Soc. 120, p. 4049 ff. (1998), J. Chem. Soc., Chem. Commun. 1998, 849. As complexes containing ligands (IVe), preference is given to using 2,6-bis(imino)pyridyl complexes of the transition metals Fe, Co, Ni, Pd or Pt, in particular Fe.

As organic transition metal compounds D), it is also possible to use iminophenoxide complexes whose ligands are prepared, for example, from substituted or unsubstituted salicylaldehydes and primary amines, in particular substituted or unsubstituted arylamines. Transition metal complexes with pi ligands which contain one or more heteroatoms in the pi system, for example the boratabenzene ligand, the pyrrolyl anion or the phospholyl anion, can also be used as organic transition metal compounds D).

Further transition metal compounds D) which are suitable for the purposes of the present invention are substituted monocyclopentadienyl, monoindenyl, monofluorenyl or heterocyclopentadienyl complexes of chromium, molybdenum or tungsten in which at least one of the substituents on the cyclopentadienyl ring bears a rigid donor function which is not bound exclusively via $sp^3$-hybridized carbon or silicon atoms. The most direct link to the donor function contains at least one sp- or $sp^2$-hybridized carbon atom, preferably from one to three $sp^2$-hybridized carbon atoms. The direct link preferably comprises an unsaturated double bond, an aromatic or together with the donor forms a partially unsaturated or aromatic heterocyclic system.

In these transition metal compounds, the cyclopentadienyl ring can also be a heterocyclopenta-dienyl ligand, i.e. at least one carbon atom can also be replaced by a heteroatom from group 15 or 16. In this case, preference is given to a carbon atom in the $C_5$-ring being replaced by phosphorus. In particular, the cyclopentadienyl ring is substituted by further alkyl groups which can also form a five- or six-membered ring, e.g. tetrahydroindenyl, indenyl, benzindenyl or fluorenyl.

Possible donors are uncharged functional groups containing an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide, or unsubstituted, substituted or fused, partially unsaturated heterocyclic or heteroaromatic ring systems.

Preference is here given to using substituted monocyclopentadienyl, monoindenyl, monofluorenyl or heterocyclopentadienyl complexes of the formula (V)

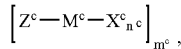  (V)

where
$M^C$ is chromium, molybdenum or tungsten and
$Z^C$ has the formula (Va)

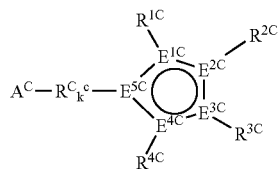  (Va)

where the variables have the following meanings:
$E^{1C}$-$E^{5C}$ are each carbon or, for not more than one atom $E^{1C}$ to $E^{5C}$, phosphorus or nitrogen,
$A^C$ is $-NR^{5C}R^{6C}$, $-PR^{5C}R^{6C}$, $-OR^{5C}$, $-SR^{5C}$ or an unsubstituted, substituted or fused, partially unsaturated heterocyclic or heteroaromatic ring system,
$R^C$ is one of the following groups:

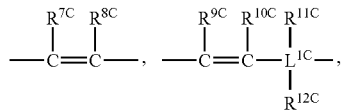

or, if $A^C$ is an unsubstituted, substituted or fused, partially unsaturated heterocyclic or heteroaromatic ring system, may also be

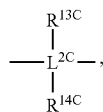

where
$L^{1C}$, $L^{2C}$ are each silicon or carbon,
$k^C$ is 1 or, if $A^{1C}$ is an unsubstituted, substituted or fused, partially unsaturated heterocyclic or heteroaromatic ring system, may also be 0,
$X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, $-NR^{15C}R^{16C}$, $-OR^{15C}$, $-SR^{15C}$, $-SO_3R^{15C}$, $-OC(O)R^{15C}$, $-CN$, $-SCN$, β-diketonate, $-CO$, $BF_4^-$, $PF_6^-$ or a bulky noncoordinating anion,
$R^{1C}$-$R^{16C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, alkylaryl having from 1 to 10 carbon atoms in the alkyl part and 6-20 carbon atoms in the aryl part, $SiR^{17C}_3$, where the organic radicals $R^{1B}R^{16B}$ may also be substituted by halogens and two geminal or vicinal radicals $R^{1C}$-$R^{16C}$ may also be joined to form a five- or six-membered ring,
$R^{17C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, and two geminal radicals $R^{17C}$ may also be joined to form a five- or six-membered ring,
$n^C$ is 1, 2 or 3 and
$m^C$ is 1, 2 or 3.

The transition metal $M^C$ is particularly preferably chromium.

Examples of organic transition metal compounds of the formula (V) are
1-(8-quinolyl)-2-methyl-4-methylcyclopentadienylchromium(III) dichloride,
1-(8-quinolyl)-3-isopropyl-5-methylcyclopentadienylchromium(III) dichloride,
1-(8-quinolyl)-3-tert-butyl-5-methylcyclopentadienylchromium(III) dichloride,
1-(8-quinolyl)-2,3,4,5-tetramethylcyclopentadienyl-chromium(III) dichloride,
1-(8-quinolyl)tetrahydroindenylchromium(III) dichloride,
1-(8-quinolyl)indenylchromium(III) dichloride,
1-(8-quinolyl)-2-methylindenylchromium(III) dichloride,
1-(8-quinolyl)-2-isopropylindenylchromium(III) dichloride,
1-(8-quinolyl)-2-ethylindenylchromium(III) dichloride,
1-(8-quinolyl)-2-tert-butylindenylchromium(III) dichloride,
1-(8-quinolyl)benzindenylchromium(III) dichloride,
1-(8-quinolyl)-2-methylbenzindenylchromium(III) dichloride,
1-(8-(2-methylquinolyl))-2-methyl-4-methylcyclopentadienylchromium(III) dichloride,
1-(8-(2-methylquinolyl))-2,3,4,5-tetramethylcyclopentadienylchromium(III) dichloride,
1-(8-(2-methylquinolyl))tetrahydroindenylchromium(III) dichloride,
1-(8-(2-methylquinolyl))indenylchromium(III) dichloride,
1-(8-(2-methylquinolyl))-2-methylindenylchromium(III) dichloride,
1-(8-(2-methylquinolyl))-2-isopropylindenylchromium(III) dichloride,
1-(8-(2-methylquinolyl))-2-ethylindenylchromium(III) dichloride,
1-(8-(2-methylquinolyl))-2-tert-butylindenylchromium(III) dichloride,
1-(8-(2-methylquinolyl))benzindenylchromium(III) dichloride or
1-(8-(2-methylquinolyl))-2-methylbenzindenylchromium(III) dichloride.

The preparation of functional cyclopentadienyl ligands has been known for a long time. Various synthetic routes for these complexing ligands are described, for example, by M. Enders et. al. in Chem. Ber. (1996), 129, 459-463, or P. Jutzi und U. Siemeling in J. Orgmet. Chem. (1995), 500, 175-185.

The metal complexes, in particular the chromium complexes, can be obtained in a simple manner by reacting the corresponding metal salts, e.g. metal chlorides, with the ligand anion (e.g. by a method analogous to the examples in DE-A 197 10 615).

Further transition metal compounds D) which are suitable for the purposes of the present invention are imidochromium compounds of the formula (VI),

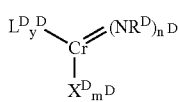

where the variables have the following meanings:

$R^D$ is $R^{1D}C{=}NR^{2D}$, $R^{1D}C{=}O$, $R^{1D}C{=}O(OR^{2D})$, $R^{1D}C{=}S$, $(R^{1D})_2P{=}O$, $(OR^{1D})_2P{=}O$, $SO_2R^{1D}$, $R^{1D}R^{2D}C{=}N$, $NR^{1D}R^{2D}$ or $BR^{1D}R^{2D}$, $C_1$-$C_{20}$-alkyl, $C_1$-$C_{20}$-cycloalkyl, $C_2$-$C_{20}$-alkenyl, $C_6$-$C_{20}$-aryl, $C_7$-$C_{40}$-alkylaryl, hydrogen if this is bound to a carbon atom, where the organic radicals $R^{1D}$ and $R^{2D}$ may also bear inert substituents, $X^D$ are each, independently of one another, fluorine, chlorine, bromine, iodine, $-NR^{3D}R^{4D}$, $-NP(R^{3D})_3$, $-OR^{3D}$, $-OSi(R^{3D})_3$, $-SO_3R^{3D}$, $-OC(O)R^{3D}$, β-diketonate, $BF_4^-$, $PF_6^-$ or a bulky weakly coordinating or noncoordinating anion, $R^{1D}R^{4D}$ are each, independently of one another, $C_1$-$C_{20}$-alkyl, $C_2$-$C_{20}$-alkenyl, $C_6$-$C_{20}$-aryl, $C_7$-$C_{40}$-alkylaryl, hydrogen if this is bound to a carbon atom, where the organic radicals $R^{1D}$ to $R^{4D}$ may also bear inert substituents, $n^D$ is 1 or 2, $m^D$ is 1, 2 or 3, where $m^{1D}$ is such that the metallocene complex of the formula (VI) is uncharged for the given valence of Cr, $L^D$ is an uncharged donor, and $y^D$ is from 0 to 3.

Such compounds and their preparation are described, for example, in WO 01/09148.

Further suitable organic transition metal compounds D) are transition metal complexes with a tridentate macrocyclic ligand, e.g.

[1,3,5-tri(methyl)-1,3,5-triazacyclohexane]chromium trichloride,

[1,3,5-tri(ethyl)-1,3,5-triazacyclohexane]chromium trichloride,

[1,3,5-tri(octyl)-1,3,5-triazacyclohexane]chromium trichloride,

[1,3,5-tri(dodecyl)-1,3,5-triazacyclohexane]chromium trichloride and

[1,3,5-tri(benzyl)-1,3,5-triazacyclohexane]chromium trichloride.

Mixtures of various organic transition metal compounds can also be used as component D).

Furthermore, preferred catalyst systems according to the present invention can be prepared using at least one organometallic compound E) in addition to the supported cocatalyst and the organic transition metal compound. Suitable organometallic compounds E) are ones of the formula (VII),

where $M^1$ is an alkali metal, an alkaline earth metal or a metal of group 13 of the Periodic Table, i.e. boron, aluminum, gallium, indium or thallium, $R^1$ is hydrogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy, $R^2$ and $R^3$ are each hydrogen, halogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-aryla-lkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy, r is an integer from 1 to 3 and s and t are integers from 0 to 2, where the sum r+s+t corresponds to the valence of $M^1$.

Among the organometallic compounds of the formula (VII) preference is given to those in which $M^1$ is lithium, boron or magnesium and $R^1$, $R^2$ and $R^3$ are each $C_1$-$C_{10}$-alkyl.

Further preferred organometallic compounds of the formula (VII) are those in which $M^1$ is aluminum and r, s and t are each 1. In particularly preferred organoaluminum compounds E) of the formula (VII), $R^1$ is $C_1$-$C_{10}$-alkyl, in particular $C_3$-$C_{10}$-alkyl. Particularly preferred organoaluminum compounds E) of the formula (VII) also include those in which $R^2$ and $R^3$ are each hydrogen, halogen or $C_1$-$C_{10}$-alkyl, in particular hydrogen or $C_3$-$C_{10}$-alkyl. Very particular preference is given to organoaluminum compounds E) of the formula (VII) in which $R^1$, $R^2$ and $R^3$ are identical and are each $C_3$-$C_{10}$-alkyl.

Particularly preferred metal compounds of the formula (VI) are n-butyllithium, n-butyl-n-octylmagnesium, n-butyl-n-heptylmagnesium, triphenylaluminum, triisoprenaluminum, tri-n-octylaluminum, tri-n-hexylaluminum, tri-n-butylaluminum, triisobutylaluminum, tri-n-propyl-aluminum, triisopropylaluminum, triethylaluminum, trispentafluorophenylborane and trimethylaluminum and mixtures thereof.

It is also possible to use mixtures of various metal compounds of the formula (VII).

In the preparation of the catalyst systems of the present invention, it is usual to prepare the supported cocatalyst obtainable from the components A), B) and C) first and subsequently bring this into contact with the organic transition metal compound D). When an organometallic compound E) is used, this can firstly be brought into contact with the organic transition metal compound D) and the resulting reaction product can then be allowed to react with the supported cocatalyst. However, the components D) and E) can also be combined successively in any order with the supported cocatalyst. It is also possible to bring the organometallic compound E) into contact with the catalyst solid obtained by reaction of the supported cocatalyst with the organic transition metal compound D) during the polymerization in the polymerization reactor, in which case it is also possible for the catalyst solid to be prepared using an organometallic compound E) which can be identical to or different from the organometallic compound E) which is added in the polymerization reactor.

In a particularly preferred embodiment, the catalyst system is prepared by firstly preparing a supported cocatalyst by bringing the components A), B) and C) into contact with one another and then bringing this into contact with at least one organic transition metal compound D). The catalyst solid obtained in this way is then, in a second step, brought into contact with at least one organometallic compound E, in particular an organoaluminum compound E), and this mixture is subsequently used without further work-up for the polymerization.

The components are usually combined in the presence of an organic solvent in which the support, the reaction products of the support and/or the resulting catalyst solid are suspended. Suitable solvents are aromatic or aliphatic solvents, for example hexane, heptane, toluene or xylene, or halogenated hydrocarbons such as methylene chloride or halogenated aromatic hydrocarbons such as o-dichlorobenzene.

The components are generally combined at temperatures in the range from −20° C. to 150° C., preferably from 0° C. to 80° C. The time for which the components which have been brought into contact are allowed to react with one another is generally from 1 minute to 48 hours. Preference is given to reaction times of from 10 minutes to 6 hours.

The molar ratio of organic transition metal compound D) to triethylaluminum B) is usually from 1:0.1 to 1:1000 and preferably from 1:1 to 1:100.

When an organometallic compound E) is used, the molar ratio of organometallic compound E) to organic transition metal compound D) is generally from 800:1 to 1:1 and preferably from 200:1 to 2:1.

The solid obtainable after the supported cocatalyst has been brought into contact with the organic transition metal compound and any further components is usually obtained as a moist solid or a suspension. This reaction product can be used as such, if appropriate together with further constituents of the catalyst system, for the polymerization of olefins. However, the reaction product is usually worked up further, preferably by drying the solid. If the solid is present in the form of a suspension, it can additionally be separated from the liquid phase beforehand, for example by filtration. Drying is generally carried out at temperatures above room temperature. Preference is given to applying a vacuum during drying. The dried catalyst solid can be used for the polymerization either as such or in resuspended form.

It is also possible for the catalyst solid to be prepolymerized with α-olefins, preferably linear $C_2$-$C_{10}$-1-alkenes and in particular ethylene or propylene, and the resulting prepolymerized catalyst solid can then be used in the actual polymerization. The mass ratio of catalyst solid used in the prepolymerization to polymerized-on monomer is usually in the range from 1:0.1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the supported catalyst system. The molar ratio of additives to organic transition metal compound D) is usually from 1:1000 to 1000:1, preferably from 1:5 to 20:1.

The polymerization can be carried out in a known manner, in bulk, in suspension, in the gas phase or in a supercritical medium in the customary reactors used for the polymerization of olefins. It can be carried out batchwise or preferably continuously in one or more stages. Solution processes, suspension processes, stirred gas-phase processes or gas-phase fluidized-bed processes are all possible. As solvent or suspension medium, it is possible to use inert hydrocarbons, for example isobutane, or else the monomers themselves.

The polymerizations can be carried out at from −60 to 300° C. and pressures in the range from 0.5 to 3000 bar. Preference is given to temperatures in the range from 50 to 200° C., in particular from 60 to 100° C., and pressures in the range from 5 to 100 bar, in particular from 15 to 70 bar. The mean residence times are usually from 0.5 to 5 hours, preferably from 0.5 to 3 hours. Molar mass regulators, for example hydrogen, or customary additives such as antistatics can also be used in the polymerization.

The process of the present invention for preparing supported cocatalysts is relatively simple. The process makes it possible to prepare catalyst systems having a good polymerization activity using a reduced amount of expensive starting materials such as boron-containing compounds or transition metal compounds or using cheaper starting materials. It is also possible to prepare catalyst systems having an increased polymerization activity.

EXAMPLES

The weight average molar mass $M_w$ and the molar mass distribution $M_w/M_n$ were determined by gel permeation chromatography (GPC) at 145° C. in 1,2,4-trichlorobenzene using a GPC apparatus 150C from Waters. The data were evaluated using the Win-GPC software from HS-Entwicklungsgesellschaft für wissenschaftliche Hard-und Software mbH, Ober-Hilbersheim. Calibration of the columns was carried out by means of polypropylene standards having molar masses of from 100 to $10^7$ g/mol.

The melting points were determined by means of DSC (differential scanning calorimetry). The measurement was carried out in accordance with ISO standard 3146 using a first heating at a heating rate of 20° C. per minute to 200° C., a dynamic crystallization at a cooling rate of 20° C. per minute down to 25° C. and a second heating at a heating rate of 20° C. per minute back to 200° C. The melting point is then the temperature at which the enthalpy vs. temperature curve measured in the second heating displays a maximum.

To determine the proportion of xylene-soluble material, 5 g of propylene polymer were added to 500 ml of distilled xylene (isomer mixture) which had previously been heated to 100° C. The mixture was subsequently heated to the boiling point of xylene and maintained at this temperature for 60 minutes. It was then cooled to 5° C. over a period of 20 minutes by means of a cold bath and then warmed up to 20° C. again. This temperature was maintained for 30 minutes. The polymer which had precipitated was filtered off. Precisely 100 ml of the filtrate were taken and the solvent was removed on a rotary evaporator. The residue which remained was dried at 80° C./250 mbar for 2 hours and weighed after cooling.

The proportion of xylene-soluble material was then calculated according to the formula $$X_S = \frac{g \times 500 \times 100}{G \times V}$$

where
$X_s$=proportion of xylene-soluble material in % when,
g=amount found in g,
G=amount of product weighed out in g and
V=volume of filtrate used in ml.

Example 1 a) Synthesis of the Supported Cocatalyst 1.58 g of silica gel (XPO 2107, Grace; dried at 130° C. for 8 h) were suspended in 15 ml of toluene at ambient temperature and admixed with 2.9 ml of triethylaluminum (1.9 M in toluene, 5.5 mmol). The suspension was stirred for 30 minutes and 1.18 g (5.6 mmol) of pentafluorophenylboronic acid were subsequently added. The reaction mixture was stirred overnight and then filtered. The residue was washed 5 times with 20 ml of toluene and dried to constant weight in an oil pump vacuum. This gave 2.89 g of a white free-flowing powder.

b) Application of the Organic Transition Metal Compound to the Support 556.9 mg of the supported cocatalyst prepared in example 1a) were suspended in 7 ml of toluene and admixed with a solution of 30.8 mg (52.4 μmol) of dimethylsilanediylbis(2- methyl-4-phenyl-indenyl)dimethylzirconium in 7 ml of toluene. The reaction mixture was stirred for one hour and then filtered. The residue was washed twice with 1 ml of toluene and dried in an oil pump vacuum.

c) Polymerization

A dry 1 l reactor was flushed firstly with nitrogen and subsequently with propylene and then charged with 350 g of propylene and 2 ml (4 mmol) of a 2 M solution of triisobutylaluminum in heptane. 91 mg of the catalyst solid prepared in example 1b) were subsequently introduced into the reactor via a lock by blowing in with argon. The reaction mixture was heated to the polymerization temperature of 65° C. and polymerized for 1 hour. The polymerization was stopped by venting the remaining propylene. This gave 295 g of a finely divided polymer. The interior walls of the reactor displayed no deposits. The catalyst activity was 3.2 kg of PP/g of catalyst solid per hour. The polypropylene obtained had the following properties: $M_w$=1 186 100 g/mol, $M_w/M_n$=2.9, melting point=149° C.

Example 2 a) Synthesis of the Supported Cocatalyst

The supported cocatalyst of example 1a) was used.

b) Application of the Organic Transition Metal Compound to the Support 715 mg of the supported cocatalyst prepared in example 1a) were suspended in 7 ml of toluene and admixed with a solution of 21.6 mg (50 µmol) of bis(1-methyl-3-n-butyl-cyclopentadienyl)zirconiumdichloride, 250 µl (0.5 mmol) of a 2 M solution of trimethylaluminum in heptane and 6 ml of toluene. The reaction mixture was stirred for one hour and then filtered. The residue was washed twice with 5 ml of toluene and dried in an oil pump vacuum.

c) Polymerization

A dry 10 l reactor was flushed firstly with nitrogen and subsequently charged with 100 ml isoprenyl aluminum and 5 l iso-butane. 347 mg of the catalyst solid prepared in example 2b) were subsequently introduced into the reactor via a lock by blowing in with nitrogen. Subsequently ethylene was introduced into the reactor and the reaction mixture was heated to the polymerization temperature of 65° C. The final pressure was 70 bar. The polymerization was stopped after 20 minutes by venting the volatile components. This gave 150 g of a finely divided polymer. The interior walls of the reactor displayed no deposits. The catalyst activity was 432 g of PE/g of catalyst solid. The polymer obtained had a $M_w$ of 782 000 g/mol.

Example 3 a) Synthesis of the Supported Cocatalyst 3.0 g of silica gel (XPO 2107, Grace; dried at 180° C. for 10 h) were suspended in 20 ml of toluene at ambient temperature and admixed with 5.6 ml of triethylaluminum (1.9M in toluene, 10.6 mmol). The suspension was stirred for 60 minutes and 1.12 g (5.3 mmol) of pentafluorophenylboronic acid were subsequently added. The reaction mixture was stirred overnight and then filtered. The residue was washed three times with 20 ml of toluene and dried to constant weight in an oil pump vacuum. This gave 5.01 g of a white free-flowing powder. The solid contained 5.9% by weight of Al and 0.57% by weight of B.

b) Application of the Organic Transition Metal Compound to the Support 3.66 g of the supported cocatalyst prepared in example 3a) were suspended in 20 ml of toluene and admixed with a solution of 86.4 mg (0.146 mmol) of dimethylsilanediylbis(2-methyl-4-phenylindenyl)dimethylzirconium in 20 ml of toluene. The reaction mixture was stirred for one hour and then filtered. The residue was washed 3 times with 20 ml of toluene and dried in an oil pump vacuum. The yield was 3.73 g.

c) Polymerization

A dry 10 l reactor was flushed firstly with nitrogen and subsequently with propylene. 3.5 ml (7 mmol) of a 2M triisobutylaluminum solution in heptane were subsequently placed in the reactor, and 135 mg of hydrogen and 2.5 kg of propylene were then introduced at 40° C. A suspension of 200 mg of the catalyst solid prepared in example 3b) in 2 ml of hexane were subsequently rinsed into the reactor with 1 kg of propylene. The reaction mixture was heated to the polymerization temperature of 65° C. over a period of 10 minutes and polymerized for 1 hour. The polymerization was stopped by venting the remaining propylene. This gave 1950 g of a finely divided polymer. The interior walls of the reactor displayed no deposits. The catalyst activity was 9.8 kg of PP/g of catalyst solid per hour. The polypropylene obtained had the following properties: $M_w$=814 400 g/mol, $M_w/M_n$=3.2, melting point=152° C., $X_s$=0.23.

Example 4

Polymerization

A dry 10 l reactor was flushed firstly with nitrogen and subsequently with propylene. 3.5 ml (7 mmol) of a 2M triisobutylaluminum solution in heptane were subsequently placed in the reactor, and 135 mg of hydrogen and 2.5 kg of propylene were then introduced at 40° C. A suspension of 201 mg of the catalyst solid prepared in example 3b) in 3 ml (2 mmol) of a 2M triisobutylaluminum solution in heptane were subsequently rinsed into the reactor with 1 kg of propylene. The reaction mixture was heated to the polymerization temperature of 65° C. over a period of 10 minutes and polymerized for 1 hour. The polymerization was stopped by venting the remaining propylene. This gave 2350 g of a finely divided polymer. The interior walls of the reactor displayed no deposits. The catalyst activity was 11.7 kg of PP/g of catalyst solid per hour. The polypropylene obtained had the following properties: $M_w$=940 800 g/mol, $M_w/M_n$=2.8, melting point=151° C., $X_s$=0.14.

Example 5 a) Synthesis of the Supported Cocatalyst 3.0 g of silica gel (XPO 2107, Grace; dried at 130° C. for 10 h) were suspended in 20 ml of toluene at ambient temperature and admixed with 8 ml of triethylaluminum (1.9M in toluene, 15.18 mmol). The suspension was stirred for 60 minutes and 1.64 g (7.59 mmol) of pentafluorophenylboronic acid were subsequently added. The reaction mixture was stirred overnight and then filtered. The residue was washed three times with 20 ml of toluene and dried to constant weight in an oil pump vacuum. This gave 5.57 g of a white free-flowing powder.

b) Application of the Organic Transition Metal Compound to the Support 2.61 g of the supported cocatalyst prepared in example 5a) were suspended in 20 ml of toluene and admixed with a solution of 61.6 mg (0.104 mmol) of dimethylsilanediylbis(2-methyl-4-phenylindenyl)dimethylzirconium in 15 ml of toluene. The reaction mixture was stirred for one hour and then filtered. The residue was washed 3 times with 20 ml of toluene and dried in an oil pump vacuum. The yield was 2.60 g of grey solid.

c) Polymerization

A dry 10 l reactor was flushed firstly with nitrogen and subsequently with propylene. 3.5 ml (7 mmol) of a 2M triisobutylaluminum solution in heptane were subsequently placed in the reactor, and 420 mg of hydrogen and 2.5 kg of propylene were then introduced at 40° C. A suspension of 109 mg of the catalyst solid prepared in example 5b) in 2 ml of hexane were subsequently rinsed into the reactor with 1 kg of propylene. The reaction mixture was heated to the polymerization temperature of 65° C. over a period of 10 minutes and polymerized for 1 hour. The polymerization was stopped by venting the remaining propylene. This gave 2050 g of a finely divided polymer. The interior walls of the reactor displayed no deposits. The catalyst activity was 18.8 kg of PP/g of catalyst solid per hour. The polypropylene obtained had the following properties: $M_w$=139 000 g/mol, $M_w/M_n$=2.6, melting point=151° C., $X_s$=0.33.

Example 6

Polymerization

A dry 10 l reactor was flushed firstly with nitrogen and subsequently with propylene. 3.5 ml (7 mmol) of a 2M triisobutylaluminum solution in heptane were subsequently placed in the reactor and 2.5 kg of propylene was then introduced at 40° C. A suspension of 303 mg of the catalyst solid prepared in example 5b) in 2 ml of hexane were subsequently rinsed into the reactor with 1 kg of propylene. The reaction mixture was heated to the polymerization temperature of 65° C. over a period of 10 minutes and polymerized for 40 minutes. Then the whole propylene was consumed. This gave 1900 g of a finely divided polymer. The interior walls of the reactor displayed no deposits. The catalyst activity was 9.3 kg of PP/g of catalyst solid per hour. The polypropylene obtained had the following properties: $M_w$=1 130 000 g/mol, $M_w/M_n$=2.8, melting point=151° C., $X_s$=0.09.

Example 7

Polymerization

A dry 10 l reactor was flushed firstly with nitrogen and subsequently with propylene. 3.5 ml (7 mmol) of a 2M triisobutylaluminum solution in heptane were subsequently placed in the reactor and 2.5 kg of propylene were then introduced at 40° C. A suspension of 254 mg of the catalyst solid prepared in example 5b) in 2 ml of hexane were subsequently rinsed into the reactor with 1 kg of propylene. The reaction mixture was first prepolymerized at 40° C. for 10 minutes and then heated to the polymerization temperature of 65° C. over a period of 10 minutes and polymerized for 40 minutes, as all propylene was used. This gave 1 550 g of a finely divided polymer. The interior walls of the reactor displayed no deposits. The catalyst activity was 9.2 kg of PP/g of catalyst solid. The polypropylene obtained had the following properties: $M_w$=1 100 000 g/mol, melting point=149° C., $X_s$=0.22.

Example 8 a) Synthesis of the Supported Cocatalyst

The supported cocatalyst of example 5a) was used.

b) Application of the Organic Transition Metal Compound to the Support 2.51 g of the supported cocatalyst prepared in example 5a) were suspended in 20 ml of toluene and admixed with a solution of 29.8 mg (0.050 mmol) of dimethylsilanediylbis (2-methyl-4-phenylindenyl)dimethylzirconium in 15 ml of toluene. The reaction mixture was stirred for one hour and then filtered. The residue was washed 3 times with 20 ml of toluene and dried in an oil pump vacuum. The yield was 2.45 g of brownish solid.

c) Polymerization

A dry 10 l reactor was flushed firstly with nitrogen and subsequently with propylene. 3.5 ml (7 mmol) of a 2M triisobutylaluminum solution in heptane were subsequently placed in the reactor and 500 mg of hydrogen and 2.5 kg of propylene were then introduced at 40° C. A suspension of 299 mg of the catalyst solid prepared in example 8b) in 2 ml of hexane were subsequently rinsed into the reactor with 1 kg of propylene. The reaction mixture was first prepolymerized at 40° C. for 10 minutes and then heated to the polymerization temperature of 65° C. over a period of 10 minutes and polymerized for 1 hour. The polymerization was finished by venting off propylene. This gave 1 620 g of a finely divided polymer. The interior walls of the reactor displayed no deposits. The catalyst activity was 5.4 kg of PP/g of catalyst solid. The polypropylene obtained had the following properties: $M_w$=58 000 g/mol, $M_w/M_n$=2.7, melting point=150° C., $X_s$=2.0.

Example 9 a) Synthesis of the Supported Catalyst 2.0 g of silica gel (XPO 2107, Grace; dried at 130° C. for 10 h) were suspended in 20 ml of toluene at ambient temperature and admixed with 5.3 ml of triethylaluminum (1.9M in toluene, 10.12 mmol). The suspension was stirred for 60 minutes and 0.82 g (3.80 mmol) of pentafluorophenylboronic acid were subsequently added. The reaction mixture was stirred overnight and then filtered. The residue was washed three times with 20 ml of toluene and dried to constant weight in an oil pump vacuum. This gave 2.88 g of a white free-flowing powder.

b) Application of the Organic Transition Metal Compound to the Support 2.65 g of the supported cocatalyst prepared in example 9a) were suspended in 20 ml of toluene and admixed with a solution of 62.2 mg (0.105 mmol) of dimethylsilanediylbis (2-methyl-4-phenylindenyl)dimethylzirconium in 10 ml of toluene. The reaction mixture was stirred for one hour and then filtered. The residue was washed 3 times with 20 ml of toluene and dried in an oil pump vacuum. The yield was 2.78 g of grey solid.

c) Polymerization

A dry 10 l reactor was flushed firstly with nitrogen and subsequently with propylene. 3.5 ml (7 mmol) of a 2M triisobutylaluminum solution in heptane were subsequently placed in the reactor, and 440 mg of hydrogen and 2.5 kg of propylene were then introduced at 40° C. A suspension of 243 mg of the catalyst solid prepared in example 9b) in 2 ml of hexane were subsequently rinsed into the reactor with 1 kg of propylene. The reaction mixture was heated to the polymerization temperature of 65° C. over a period of 10 minutes and polymerized for 1 hour. The polymerization was stopped by venting the remaining propylene. This gave 1 120 g of a finely divided polymer. The interior walls of the reactor displayed no deposits. The catalyst activity was 4.6 kg of PP/g of catalyst solid per hour. The polypropylene obtained had the following properties: $M_w$=123 600 g/mol, $M_w/M_n$=2.6, melting point=150° C., $X_s$=0.50.

Example 10

Polymerization

A dry 10 l reactor was flushed firstly with nitrogen and subsequently with propylene. 3.5 ml (7 mmol) of a 2M triisobutylaluminum solution in heptane were subsequently placed in the reactor and 2.5 kg of propylene were then introduced at 40° C. A suspension of 446 mg of the catalyst solid prepared in example 9b) in 2 ml of hexane were subsequently rinsed into the reactor with 1 kg of propylene. The reaction mixture was prepolymerized for 10 minutes at 40° C., heated to the polymerization temperature of 65° C. over a period of 10 minutes and polymerized for 1 hour. The polymerization was stopped by venting the remaining propylene. This gave 1 130 g of a finely divided polymer. The interior walls of the reactor displayed no deposits. The catalyst activity was 2.5 kg of PP/g of catalyst solid per hour. The polypropylene obtained had the following properties: $M_w$=1 275 000 g/mol, $M_w/M_n$=2.7, melting point=151° C., $X_s$=0.16.

Example 11

Polymerization

A dry 10 l reactor was flushed firstly with nitrogen and subsequently with propylene. 3.5 ml (7 mmol) of a 2M triisobutylaluminum solution in heptane were subsequently placed in the reactor, and 300 mg of hydrogen and 2.5 kg of propylene were then introduced at 40° C. A suspension of 245 mg of the catalyst solid prepared in example 9b) in 2 ml of hexane were subsequently rinsed into the reactor with 1 kg of propylene. The reaction mixture was prepolymerized at 40° C. for 10 minutes, heated to the polymerization temperature of 65° C. over a period of 10 minutes and polymerized for 1 hour. The polymerization was stopped by venting the remaining propylene. This gave 2 610 g of a finely divided polymer. The interior walls of the reactor displayed no deposits. The catalyst activity was 10.7 kg of PP/g of catalyst solid per hour. The polypropylene obtained had the following properties: $M_w$=349 000 g/mol, $M_w/M_n$=3.6, melting point=151° C., $X_s$=0.15.

Comparative Example A a) Synthesis of the Supported Cocatalyst 0.8 g of silica gel (XPO 2107, Grace; dried at 180° C. for 10 h) were suspended in 20 ml of toluene at ambient temperature and admixed with 0.41 ml of trimethylaluminum (2M in toluene, 0.82 mmol). The suspension was stirred for 60 minutes and 0.29 g (0.82 mmol) of pentafluorophenylborinic acid were subsequently added. The reaction mixture was stirred overnight and then filtered. The residue was washed three times with 20 ml of toluene and dried to constant weight in an oil pump vacuum. This gave 1.1 g of a white free-flowing powder.

b) Application of the Organic Transition Metal Compound to the Support 0.312 g of the supported cocatalyst prepared in example Aa) were suspended in 8 ml of toluene and admixed with a solution of 33.2 mg (0.056 mmol) of dimethylsilanediylbis (2-methyl-4-phenylindenyl)dimethylzirconium in 6 ml of toluene. The reaction mixture was stirred for 30 minutes and then filtered. The residue was washed 3 times with 5 ml of toluene and dried in an oil pump vacuum. The yield was 296 mg of light orange solid.

c) Polymerization

A dry 1 l reactor was flushed firstly with nitrogen and subsequently with propylene. 2 ml (4 mmol) of a 2M triisobutylaluminum solution in heptane were subsequently placed in the reactor, and 350 g of propylene were then introduced at 40° C. 296 mg of the catalyst solid prepared in example Ab) were added into the reactor under nitrogen stream. The reaction mixture was heated to the polymerization temperature of 65° C. over a period of 10 minutes and polymerized for 1 hour. The polymerization was stopped by venting the remaining propylene. There was no polymer formed during the trial.

Comparative Example B a) Synthesis of the Supported Cocatalyst 1.5 g of silica gel (XPO 2107, Grace; dried at 180° C. for 10 h) were suspended in 15 ml of toluene at ambient temperature and admixed with 2.6 ml of trimethylaluminum (2M in toluene, 5.2 mmol). The suspension was stirred for one hour and 1.12 g (5.3 mmol) of pentafluorophenylboronic acid were subsequently added. The reaction mixture was stirred overnight and then filtered. The residue was washed three times with 20 ml of toluene and dried to constant weight in an oil pump vacuum. This gave 1.89 g of a white free-flowing powder.

b) Application of the Organic Transition Metal Compound to the Support 1.89 g of the supported cocatalyst prepared in example Ba) were suspended in 10 ml of toluene and admixed with a solution of 32 mg (0.054 mmol) of dimethylsilanediylbis(2-methyl-4-phenylindenyl)dimethylzirconium in 15 ml of toluene. The reaction mixture was stirred for one hour and then filtered. The residue was washed 3 times with 20 ml of toluene and dried in an oil pump vacuum. The yield was 1.68 g of beige solid.

c) Polymerization

A dry 10 l reactor was flushed firstly with nitrogen and subsequently with propylene. 7 ml (7 mmol) of a 1M triethylaluminum solution in heptane were subsequently placed in the reactor, and 180 mg of hydrogen and 2.5 kg of propylene were then introduced at 40° C. A suspension of 416 mg of the catalyst solid prepared in example Bb) in 2 ml of hexane were subsequently rinsed into the reactor with 1 kg of propylene. The reaction mixture was heated to the polymerization temperature of 65° C. over a period of 10 minutes and polymerized for 1 hour. The polymerization was stopped by venting the remaining propylene. No polymer was formed during the trial.

Comparative Example C

Polymerization

A dry 10 l reactor was flushed firstly with nitrogen and subsequently with propylene. 180 mg of hydrogen was let into in the reactor and 2.5 kg of propylene were then introduced at 40° C. A suspension of 306 mg of the catalyst solid prepared in example Bb) in 4 ml of 2M triisobutylaluminum were subsequently rinsed into the reactor with 1 kg of propylene. The reaction mixture was heated to the polymerization temperature of 65° C. over a period of 10 minutes and polymerized for 1 hour. The polymerization was stopped by venting the remaining propylene. No polymer was formed during the trial.

Comparative Example D a) Synthesis of the Supported Cocatalyst 2.0 g of silica gel (XPO 2107, Grace; dried at 180° C. for 10 h) were suspended in 20 ml of toluene at ambient temperature and admixed with 7.0 ml of triisobutylaluminum (1M in toluene, 7.0 mmol). The suspension was stirred for one hour and 1.48 g (7.0 mmol) of pentafluorophenylboronic acid were subsequently added. The reaction mixture was stirred overnight and then filtered. The residue was washed three times with 20 ml of toluene and dried to constant weight in an oil pump vacuum. This gave 2.94 g of a white free-flowing powder.

b) Application of the Organic Transition Metal Compound to the Support 1.45 g of the supported cocatalyst prepared in example Da) were suspended in 15 ml of toluene and admixed with a solution of 47 mg (0.084 mmol) of dimethylsilanediylbis(2-methyl-4-phenylindenyl)dimethylzirconium in 15 ml of toluene. The reaction mixture was stirred for one hour and then filtered. The residue was washed 3 times with 20 ml of toluene and dried in an oil pump vacuum. The yield was 1.58 g of light brown solid.

c) Polymerization

A dry 10 l reactor was flushed firstly with nitrogen and subsequently with propylene. 7 ml (7 mmol) of a 1M triethylaluminum solution in heptane were subsequently placed in the reactor, and 180 mg of hydrogen and 2.5 kg of propylene were then introduced at 40° C. A suspension of 297 mg of the catalyst solid prepared in example Db) in 2 ml of hexane were subsequently rinsed into the reactor with 1 kg of propylene. The reaction mixture was heated to the polymerization temperature of 65° C. over a period of 10 minutes and polymerized for 1 hour. The polymerization was stopped by venting the remaining propylene. No polymer was formed during the trial.

Comparative Example E

Polymerization

A dry 10 l reactor was flushed firstly with nitrogen and subsequently with propylene. 1 ml (1 mmol) of a 1M triethylaluminum solution in heptane were subsequently placed in the reactor, and 180 mg of hydrogen and 2.5 kg of propylene were then introduced at 40° C. A suspension of 305 mg of the catalyst solid prepared in example Db) in 3 ml of 2M triisobutylaluminum solution were subsequently rinsed into the reactor with 1 kg of propylene. The reaction mixture was heated to the polymerization temperature of 65° C. over a period of 10 minutes and polymerized for 1 hour.

The polymerization was stopped by venting the remaining propylene. No polymer was formed during the trial.

Comparative Example F a) Synthesis of the Supported Cocatalyst 2.0 g of silica gel (XPO 2107, Grace; dried at 180° C. for 10 h) were suspended in 20 ml of toluene at ambient temperature and admixed with 7.1 ml of diisobutylaluminum hydride (1M in toluene, 7.0 mmol). The suspension was stirred for one hour and 0.75 g (3.53 mmol) of pentafluorophenylboronic acid were subsequently added. The reaction mixture was stirred overnight and then filtered. The residue was washed three times with 20 ml of toluene and dried to constant weight in an oil pump vacuum. This gave 2.97 g of a white free-flowing powder.

b) Application of the Organic Transition Metal Compound to the Support 2.69 g of the supported cocatalyst prepared in example Fa) were suspended in 15 ml of toluene and admixed with a solution of 63 mg (0.107 mmol) of dimethylsilanediylbis(2-methyl-4-phenylindenyl)dimethylzirconium in 15 ml of toluene. The reaction mixture was stirred for one hour and then filtered. The residue was washed 3 times with 20 ml of toluene and dried in an oil pump vacuum. The yield was 2.81 g of beige solid.

c) Polymerization

A dry 10 l reactor was flushed firstly with nitrogen and subsequently with propylene. 7 ml (7 mmol) of a 1M triethylaluminum solution in heptane were subsequently placed in the reactor, and 180 mg of hydrogen and 2.5 kg of propylene were then introduced at 40° C. A suspension of 517 mg of the catalyst solid prepared in example Fb) in 1 ml of 2M triisobutylaluminum were subsequently rinsed into the reactor with 1 kg of propylene. The reaction mixture was heated to the polymerization temperature of 65° C. over a period of 10 minutes and polymerized for 1 hour. The polymerization was stopped by venting the remaining propylene. 60 g polymer was formed during the trial. The catalyst activity was 0.12 kg of PP/g of catalyst solid per hour. The polypropylene obtained had the following properties: $M_w$=645 000 g/mol, $M_w/M_n$=3.1, melting point=149° C., $X_s$=0.39.

We claim:

1. A process for preparing a supported cocatalyst for olefin polymerization, which comprises first reacting
   A) support bearing functional groups, with
   B) triethylaluminum, thereby producing a reaction product; and subsequently reacting the reaction product with
   C) a compound of the formula (I),

where
   A is an atom of group 13 or 15 of the Periodic Table;
   $R^1$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalky, $C_7$-$C_{40}$-haloarylalkyl, $C_7$-$C_{40}$-alkylaryl, $C_7$-$C_{40}$-haloalkylaryl or an $OSiR^2_3$ group, where
   $R^2$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl;
   y is 1 or 2; and
   x is 3 minus y.

2. The process as claimed in claim 1, wherein A in formula (I) is boron.

3. The process as claimed in claim 2, wherein $R^1$ in formula (I) is $C_6$-$C_{10}$-haloaryl, $C_7$-$C_{20}$-alkylaryl or $C_7$-$C_{20}$-haloalkylaryl.

4. A supported cocatalyst obtained by a process comprising first reacting
   A) support bearing functional groups, with
   B) triethylaluminum, thereby producing a reaction product and subsequently reacting the reaction product with
   C) a compound of the formula (I),

where
- A is an atom of group 13 or 15 of the Periodic Table;
- $R^1$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalky, $C_7$-$C_{40}$-haloarylalkyl, $C_7$-$C_{40}$-alkylaryl, $C_7$-$C_{40}$-haloalkylaryl or an $OSiR^2_3$ group, where
- $R^2$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl;
- y is 1 or 2; and
- x is 3 minus y.

5. A process comprising preparing a catalyst system for the polymerization of olefins with a supported cocatalyst, the supported cocatalyst being prepared by
first reacting
- A) support bearing functional groups, with
- B) triethylaluminum, thereby producing a reaction product and subsequently reacting the reaction product with
- C) a compound of the formula (I),

where
- A is an atom of group 13 or 15 of the Periodic Table;
- $R^1$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalky, $C_7$-$C_{40}$-haloarylalkyl, $C_7$-$C_{40}$-alkylaryl, $C_7$-$C_{40}$-haloalkylaryl or an $OSiR^2_3$ group, where
- $R^2$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl;
- y is 1 or 2; and
- x is 3 minus y.

and then bringing the supported cocatalyst into contact with
- D) at least one organic transition metal compound.

6. A catalyst system for the polymerization of olefins, obtained by bringing at least one supported cocatalyst obtained by a process comprising
first reacting
- A) support bearing functional groups, with
- B) triethylaluminum, thereby producing a reaction product and subsequently reacting the reaction product with
- C) a compound of the formula (I),

where
- A is an atom of group 13 or 15 of the Periodic Table;
- $R^1$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalky, $C_7$-$C_{40}$-haloarylalkyl, $C_7$-$C_{40}$-alkylaryl, $C_7$-$C_{40}$-haloalkylaryl or an $OSiR^2_3$ group, where
- $R^2$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl;
- y is 1 or 2; and
- x is 3 minus y into contact with
- D) at least one organic transition metal compound.

7. The catalyst system for the polymerization of olefins as claimed in claim 6, wherein
- E) at least one organometallic compound is additionally added in its preparation.

8. The catalyst system for the polymerization of olefins as claimed in claim 7 which is prepared by:
firstly preparing a catalyst solid by bringing the at least one supported cocatalyst into contact with the at least one organic transition metal compound D), then bringing the catalyst solid into contact with the at least one organometallic compound E) in a second step, thereby forming a mixture and then using the mixture without further work-up for the polymerization.

9. A process comprising polymerizing olefins with a catalyst system obtained by bringing at least one supported cocatalyst obtained by a process comprising
first reacting
- A) support bearing functional groups, with
- B) triethylaluminum thereby producing a reaction product and subsequently reacting the reaction product with
- C) a compound of the formula (I),

where
- A is an atom of group 13 or 15 of the Periodic Table;
- $R^1$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalky, $C_7$-$C_{40}$-haloarylalkyl, $C_7$-$C_{40}$-alkylaryl, $C_7$-$C_{40}$-haloalkylaryl or an $OSiR^2_3$ group, where
- $R^2$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl;
- y is 1 or 2; and
- x is 3 minus y into contact with
- D) at least one organic transition metal compound.

\* \* \* \* \*

UNITED STATES PATENT AND TRADEMARK OFFICE
CERTIFICATE OF CORRECTION

| | |
|---|---|
| PATENT NO. | : 7,442,667 B2 |
| APPLICATION NO. | : 10/583064 |
| DATED | : October 28, 2008 |
| INVENTOR(S) | : Naka Seidel et al. |

Page 1 of 1

It is certified that error appears in the above-identified patent and that said Letters Patent is hereby corrected as shown below:

At col. 29, line 11, before "$C_6$-$C_{20}$-haloaryl" insert --$C_6$-$C_{20}$ aryl,--

Signed and Sealed this

Tenth Day of November, 2009

David J. Kappos
*Director of the United States Patent and Trademark Office*